United States Patent
Basteck (10) Patent No.: US 7,914,411 B2
(45) Date of Patent: *Mar. 29, 2011

(54) DRIVE TRAIN FOR THE TRANSMISSION OF A VARIABLE POWER

(75) Inventor: Andreas Basteck, Lörrach (DE)

(73) Assignee: Voith Turbo, GmbH & Co. KG, Heidenheim (DE)

( * ) Notice: Subject to any disclaimer, the term of this patent is extended or adjusted under 35 U.S.C. 154(b) by 1121 days.

This patent is subject to a terminal disclaimer.

(21) Appl. No.: 10/550,920

(22) PCT Filed: Mar. 25, 2004

(86) PCT No.: PCT/EP2004/003143
§ 371 (c)(1),
(2), (4) Date: Aug. 28, 2006

(87) PCT Pub. No.: WO2004/088132
PCT Pub. Date: Oct. 14, 2004

(65) Prior Publication Data
US 2007/0007769 A1 Jan. 11, 2007

(30) Foreign Application Priority Data
Mar. 31, 2003 (DE) .................................. 103 14 757

(51) Int. Cl.
*F16H 47/06* (2006.01)
(52) U.S. Cl. ......................................................... 475/35
(58) Field of Classification Search .................... 475/31, 475/34, 35, 36, 40, 41, 47, 48, 49, 50, 51, 475/53, 72, 77; 290/40 C, 43, 44, 54, 55, 290/1 C
See application file for complete search history.

(56) References Cited

U.S. PATENT DOCUMENTS

| | | | | |
|---|---|---|---|---|
| 2,114,179 A | * | 4/1938 | Fottinger | 475/53 |
| 2,260,846 A | * | 10/1941 | Voytech | 475/53 |
| 2,682,786 A | * | 7/1954 | Flinn | 475/36 |

(Continued)

FOREIGN PATENT DOCUMENTS

DE 723828 8/1942

(Continued)

OTHER PUBLICATIONS

De Bruijin, P.M.J., The identification of the Volkwagen Bora 1.6 I. petrol engine, used in the EcoDrive project [online], Jul. 2003 [retrieved Jul. 22, 2010]. Retrieved from the Internet:< URL: http://alexandria.tue.nl/repository/books/615459.pdf> pp. 21 and 22 of 46.*

*Primary Examiner* — Sherry Estremsky
(74) *Attorney, Agent, or Firm* — Ohlandt, Greeley, Ruggiero & Perle, L.L.P.

(57) ABSTRACT

A drive train having a power-split transmission for distributing the power to at least one first power branch and at least one second power branch. The first power branch at least indirectly drives an electric generator, while a connection is established between the first power branch and the second power branch by a hydrodynamic circuit, which is disposed at the output end of the power-split transmission. The power flow is influenced in such a way by the hydrodynamic circuit that the speed at which the electric generator is driven is substantially constant.

10 Claims, 11 Drawing Sheets

U.S. PATENT DOCUMENTS

| | | | | |
|---|---|---|---|---|
| 3,078,739 | A * | 2/1963 | Weinrich | 74/720 |
| 3,507,168 | A * | 4/1970 | Carp | 475/54 |
| 3,934,414 | A * | 1/1976 | Merkle et al. | 60/342 |
| 4,239,977 | A | 12/1980 | Strutman | 290/44 |
| 4,586,400 | A | 5/1986 | Nygren | 74/675 |
| 7,081,689 | B2 * | 7/2006 | Tilscher et al. | 290/44 |
| 7,297,084 | B2 * | 11/2007 | Kimura et al. | 475/59 |
| 2009/0286641 | A1 * | 11/2009 | List | 474/202 |

FOREIGN PATENT DOCUMENTS

| | | |
|---|---|---|
| DE | 967306 | 7/1949 |
| DE | 812660 | 7/1951 |
| DE | 1600228 | 2/1970 |
| DE | 7026708.2 | 11/1970 |
| DE | 41 03 863 A1 | 8/1992 |
| DE | 43 21 755 A1 | 12/1993 |
| DE | 44 29 855 C1 | 8/1995 |
| EP | 0 120 654 | 4/1984 |
| EP | 0 635 639 | 1/1995 |
| WO | WO 81/01444 | 5/1981 |
| WO | WO 03076829 A1 * | 9/2003 |

* cited by examiner

DRIVE TRAIN FOR THE TRANSMISSION OF A VARIABLE POWER

RELATED APPLICATIONS

This application claims priority in PCT International Application No. PCT/EP2004/003143, filed Mar. 25, 2004, and German Application No. DE 103 14 757.8, filed on Mar. 31, 2003, the disclosures of which are incorporated herein by reference.

BACKGROUND OF THE INVENTION

1. Field of the Invention

The invention relates to a drive train for the transmission of a variable power at a variable input speed and a constant output speed. The invention relates, in particular, to stations having a variable power load, such as those encountered in the use of wind and water natural energy resources as well as other resources.

2. Description of the Related Art

The use of wind energy is of interest, above all, for powers of greater than 1 MW. Furthermore, it is necessary to design the operational management of stations in such a way that a maximal power production occurs at a minimal dynamic load. In order to design the efficiency of the entire system in an optimal way, both during the phase when the unit is started up as well as during the operating phase and during standstill, a speed control for the operating machine is required, which can also be assisted in certain areas by additional kinds of control (e.g., positional adjustment of the rotor blades).

To be presented in the following, therefore, by way of wind power stations as example, is the problem of a time-variable power transmission, particularly in the case of an input speed that changes in time and a corresponding torque that changes in time, when, as secondary condition for the power transmission, an output speed that is essentially constant in time is required.

The operation of a wind power station is characteristic of the problem posed above for the reason that the electric power generated by the wind power station is fed into a power grid network that has a fixed network frequency. Because the network frequency represents the primary quantity for stabilizing and controlling the network, a prerequisite for a direct coupling of the generator of the wind power station is that it be supplied by the drive train at a constant speed. Such wind power stations are also referred to as fixed-speed wind power stations.

Conventionally used in such a case for fixed-speed wind power stations have been asynchronous generators, which, on account of the principle-governed slip, can be interconnected with a grid network in a simple way.

In contrast to the system requirement for wind power stations of a constant output speed on the drive train is the power input, which varies in time owing to the fluctuating wind situations. This problem is further aggravated by the mechanical power conversion of the kinetic energy of the air flow into the kinetic energy of the rotor motion, which is a characteristic inherent to the system. In the case of a fixed-speed wind power station, a specific rotor frequency or a few rotor frequencies is or are defined. More than one rotor frequency is possible only when a pole-changing generator is used or when different generators are used. In this case, the desired rotational speed of the rotor is conventionally attained by adjusting the angle of the rotor blades, this also being referred to as pitch control.

A drawback of fixed-speed wind power stations is the fact that, for partial loads, which occur commonly for typical wind situations, operation can occur only at reduced efficiency.

If a wind power station is operated at variable speed in the partial-load region, there exists the possibility of designing a drive train with either variable or constant output speed. In either case, the output power also varies in time on account of the time-variable torque.

For wind power stations, the first case leads to the use of frequency converters having a direct current link. However, this approach detours away from the problem posed here and, in particular, is encumbered with additional problems, such as a strong network feedback in connection with an increased harmonic load and high reactive powers.

The second approach, namely, coupling a variable rotor speed of the wind power station with a constant generator speed, corresponds to the subject presented here of a drive train for the transmission of a variable power at a variable input speed and a constant output speed. The known solutions of this problem, particularly for wind power stations, employ a superimposing gear unit in the drive train, which is used for splitting or superimposing the mechanical power. Known in the case of fixed-speed wind power stations are only two approaches that are based on this and are used for keeping the generator frequency constant.

In the first system, the input power is distributed via the superimposing gear unit to a large generator and a small servomotor, with approximately 30% of the input power usually being transmitted to the servomotor. The generator is coupled to the power network at fixed frequency, while the servomotor is connected to the network via a frequency converter. For stabilization of the generator speed, the servomotor is operated either as a motor or as a generator. This system is also not free of feedback for the power network. Furthermore, such a system can be controlled only with difficulty and has, as power storage, essentially only the inert mass of the drive train and of the rotor. In addition, the investment costs are relatively high on account of the use of frequency converters.

In the second system, which operates in a hydrostatic manner, hydraulic motors and pumps are used in place of the electric servomotor. Here, too, the problem of a difficult control characteristic arises, in particular a sluggish response behavior and relevant dead times as well as strong nonlinearities. Moreover, the hydraulic system components present a drawback due to their design cost and their weight.

Summarized in the following table are the different known controls of the effective power of wind power stations that have been presented:

|  | Generator with converter | Generator with converter and fixed-ratio gear unit | | | Generator with superimposing gear unit | |
|---|---|---|---|---|---|---|
| System type | Electronic | One-stage gear unit | Gear unit | Gear unit | With electric motor | With hydrostatics |
| Generator | permanently excited | synchronous generator | 4/6 pole asynchronous | 4/6 pole double-fed | 4/6 pole asynchronous | 4/6 pole asynchronous |

-continued

| | Generator with converter | Generator with converter and fixed-ratio gear unit | | | Generator with superimposing gear unit | |
|---|---|---|---|---|---|---|
| | synchronous generator | | or synchronous generator | asynchronous generator | or synchronous generator | or synchronous generator |
| Converter | PWM - VSI | PWM - VSI | PWM - VSI | PWM - VSI | — | — |
| Gear unit | | planetary stage | Planetary stage + spur stage | planetary stage + spur stage | planetary stage + superimposing gear stage | planetary stage + superimposing gear stage |
| Control | rotor blades, speed | rotor blades, speed | rotor blades, slip pole change | throttling of the speed | rotor blades, speed | rotor blades, speed |

SUMMARY OF THE INVENTION

The invention is based on the problem of designing a drive train for the transmission of a variable power in such a way that a power input can be loaded at essentially constant speed, so that the transmission process proceeds at a high efficiency and jerks in the drive train are minimized. Furthermore, a short-time energy storage is to be designed in the drive train in order to improve the control characteristic of the system. In addition to this, the number of components involved and the investment costs are to be kept at a low level.

The principle of the invention leads to a very good efficiency. In the case of wind power stations, the drive train of the invention leads, even for an uneven wind profile and the different rotor speeds associated therewith, to a generator speed that is at a nearly uniform level.

Up to now, various adjustment and control possibilities with greater and lesser influence on the efficiency have been known for wind power stations:
  setting of the rotor blade angle,
  variable speed of the generator,
  slip control,
  throttling of the speed of the generator,
  changing the pole number, and
  speed control in the superimposing gear unit.

For the mechanism of operation of the speed control in accordance with the invention, it is possible to implement a combination of existing adjustment and control possibilities—for example, the setting of the rotor blade angle and the speed control in the superimposing gear unit. In the process, the rotor of the wind power station is always operated along its optimal characteristic curve (optimal efficiency) and a constant speed is delivered at the generator.

BRIEF DESCRIPTION OF THE DRAWINGS

The invention is explained in greater detail on the basis of drawings. In them, the following is depicted in detail.

DESCRIPTION OF THE INVENTION

The rotor power $p_R$ of a wind power station is related in approximation to the wind speed $v_W$ as follows:

$$p_R = k\, c_P(v_W, \omega_R, \beta) v_W^3$$

Here, k comprises various constants, such as, for example, the blade geometry and the density of the air. Furthermore, $c_P$ represents the performance coefficient, which, in turn, as shown, depends on the wind speed $v_W$, the rotor speed $\omega_R$, and the pitch angle $\beta$. This performance coefficient is characterized by a global maximum, which shifts to higher rotor speeds $\omega_R$ as the wind speed $v_W$ increases.

Figure 2:
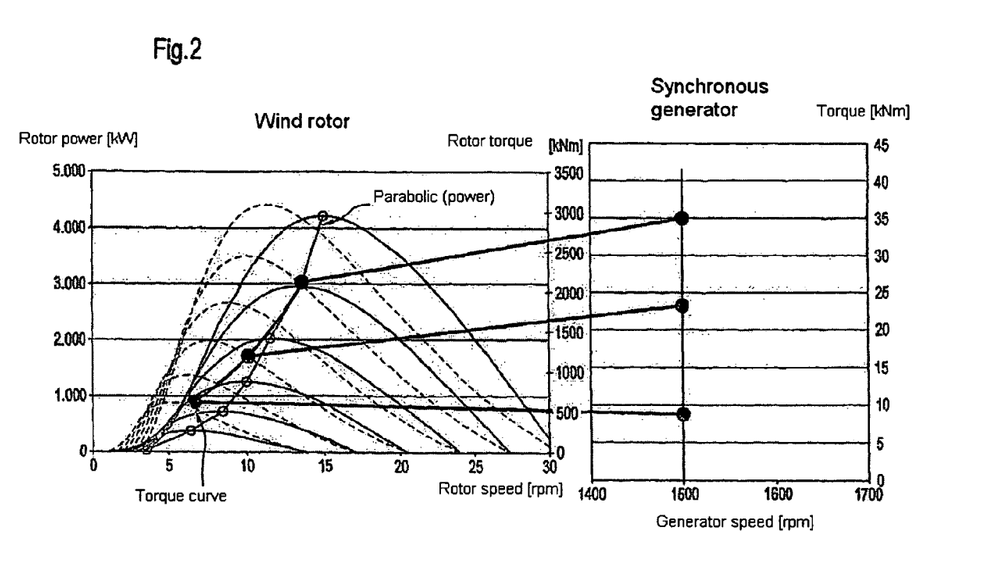
FIG. 2 shows a graph that illustrates the torque and power input characteristic of a wind rotor as a function of the wind speed and the wind rotor speed and the associated variable input speed of the drive train of the invention as well as the constant output speed to the generator.

FIG. 2 shows this relation by way of the depiction of groups of solid curves for the effective power of the rotor and of groups of dashed curves for the torque of a wind power station that is input by the rotor, taking into consideration various wind speeds, whereby the individual curves in the groups of curves are each assigned, by way of example, to a wind speed. Characteristic is the shift of the optimal rotor speed to higher values at increasing wind speed, these values lying in FIG. 2 on a curve that is referred to as a parabolic. A variable-speed station can accordingly be driven at optimal power performances in each case depending on the available wind speed.

Typically, wind power stations are laid out for specific nominal powers linked to a nominal speed. For wind power above this threshold value, a power limitation takes place, either through pitch control or through stall control, so that, for the variable-speed operation of a wind power station, the partial-load operation is of particular importance.

Figure 10:
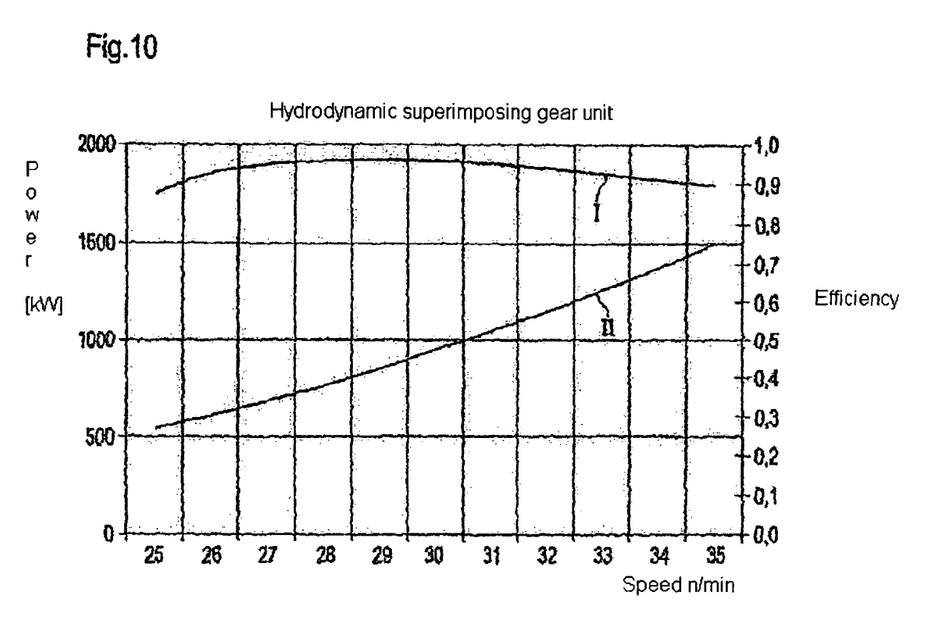
FIG. 10 shows schematically the effective power curve of a wind power station having a drive train of the invention.

The drive train of the invention has a very good efficiency for transmission over the entire range of speeds, reference being made for this to the design example depicted in FIG. 10, for which a maximum transmitted power of up to 2.5 MW in a drive-speed range of n=10–18 rpm at a constant output speed of n=1500 rpm was calculated. Curve I in FIG. 10 shows the uniformly high efficiency and curve II traces the power transmitted for this example.

For wind power stations having a drive train of the invention, the following control functions or operating states are to be taken into account depending on the wind:
  switching on and switching off,
  braking of the rotors,
  operation at varying wind speeds, and
  operation at constant wind speeds around an optimal point of operation.

A variable-speed wind power station can be constructed advantageously with a drive train of the invention for the transmission of a variable power at a variable input speed and a constant output speed, which, in turn, is transmitted to a generator.

Figure 1:
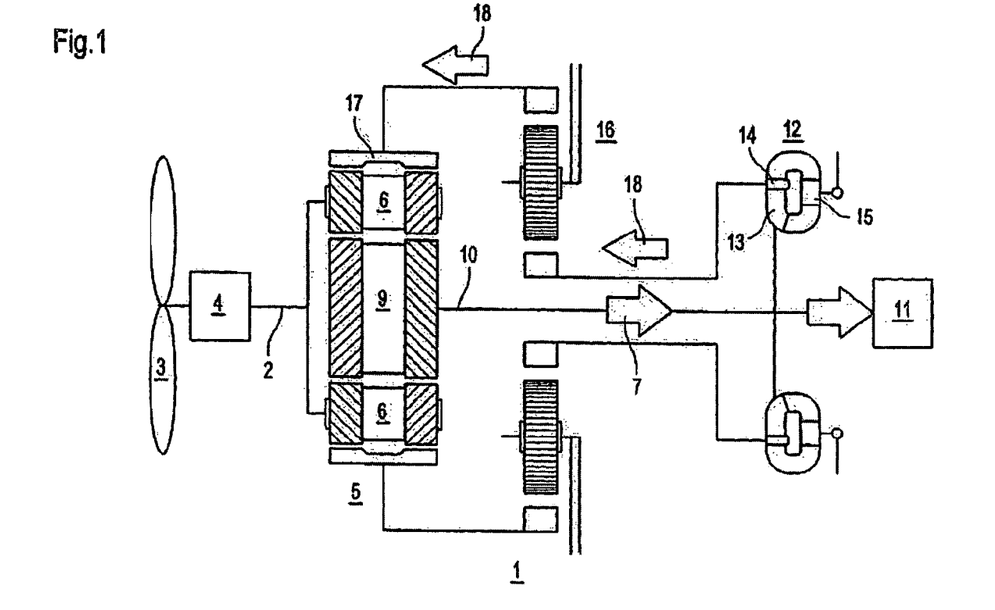
FIG. 1 is a schematic depiction of a power-split wind power station in accordance with the invention, having a hydrodynamic Föttinger converter as hydrodynamic circuit.

To this end, FIG. 1 shows, in a schematically simplified manner, such a drive train 1 of the invention. It comprises an input shaft 2, which is joined at least indirectly to the rotor 3 of a wind power machine. In the present case, a gear unit 4 having a constant gear ratio is placed between the rotor 3 of the wind power machine and the input shaft 2. Such an intervening gear unit 4 is advantageous, but it is not absolutely essential; depending on the applied case, it can serve to expand the range of possible rotor speeds and to adjust the efficiency in an optimal manner.

The drive train of the invention has a superimposing gear unit for power splitting, which, in the following, is referred to as a power-split transmission 5. In the embodiment example depicted here, a planetary gear unit is used as the power-split transmission 5 of the drive train 1, the input shaft 2 being connected to the planetary gear carrier 6. Two power branches are then present in the power-split transmission 5. The first power branch 7 conveys power via the sun wheel 9 to the output shaft 10 of the drive train. This output shaft 10 drives at least indirectly the electric generator 11 and is in working connection with the hydrodynamic Föttinger converter, which, in the present embodiment example, serves as hydrodynamic circuit 12. To this end, the output shaft 10 is connected at least indirectly to the pump impeller 13 of the hydrodynamic Föttinger converter.

The output shaft 10 advantageously involves a rapidly spinning shaft. In the present application, a rapidly spinning shaft is understood to refer to one whose speed is a multiple of the speed of the input shaft 2. Especially preferred is a typical rotational speed of the output shaft 10 that is suitable for directly driving the electric generator 11—for example, 1500 rpm. Also conceivable are other speed values for the output shaft 10, depending on the pole number of the electric generator 11 or the existing network frequency. The construction of a rapidly spinning output shaft 10 affords the advantage that the hydrodynamic circuit 12—in this case, the hydrodynamic Föttinger converter—which is in at least indirect working connection with the output shaft 10, can be operated efficiently—that is, at high speed.

Used as reaction member 15 in the hydrodynamic converter is a stator having adjustable vanes, with which the power input of the pump and thus the power flow to the turbine wheel 14 can be adjusted. Via the turbine wheel 14, in turn, there occurs a power backflow with power conversion to the ring gear 17, which is translated via a second planetary gear set 16, designed as a stationary transmission. This additional planetary gear set 16 is optional, but it is preferred, because, through this measure, an increase in speed on the output shaft 10, the preferably rapidly spinning shaft, and an increase in the relative speed of the pump impeller 13 and the turbine wheel 14 in the hydrodynamic circuit 12 is achieved. This affords, in particular, the possibility of designing the hydrodynamic circuit 12 to have a small construction.

The variable power backflow to the ring gear 17 of the power-split transmission 5 effects a variably adjustable gear ratio. This represents the second power branch 18 of the power-split transmission, which, in the present embodiment example, serves the power backflow. Here, the planetary gear set 16 is to be regarded as optional. In the present embodiment example of a drive train of the invention, it serves for diminishing the turbine speed at which the hydrodynamic Föttinger converter can be operated. Higher pump and turbine speeds bring about an increase in efficiency or afford the possibility of designing the hydrodynamic Föttinger converter to have a small construction.

The drive train of the invention, having a hydrodynamic Föttinger converter as hydrodynamic circuit 12, is then designed in terms of construction in such a way that, through the choice of the mechanical gear ratios in the power-split transmission as well as through the dimensioning of the hydrodynamic Föttinger converter, the parabolic characteristic curve of the optimal power input is reproduced by the wind rotor 3. The starting point for this is that, for each wind speed, it is possible to specify an ideal rotor speed for the maximal power input. To this end, reference is made to the preceding discussion in regard to FIG. 2. A further condition is that, at the same time, an essentially constant output speed of the drive train is specified in advance for the electric generator. In the present case, this lies at 1500 rpm at a network frequency of f=50 Hz. The requisite rotational speeds of the transmission components of the power-split transmission, namely the rotational speed of the ring gear 17 and the rotational speed of the sun wheel 9, can now be established, taking into account these prespecified values, for each wind speed in the partial-load region. In doing so, care is to be taken that the drive train must reproduce the parabolic power input characteristic for an essentially constant positional setting of the reaction member 15 of the hydrodynamic Föttinger converter 12.

Figure 3:
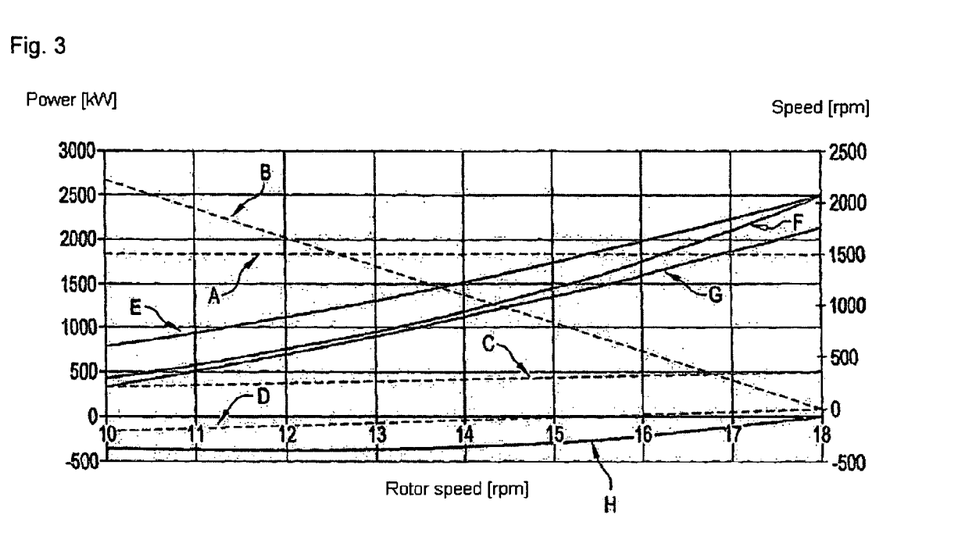
FIG. 3 depicts the power flows and speeds of the individual branches of the mechanical hydrodynamic drive train as a function of the wind turbine speed.

FIG. 3 depicts, on the basis of an elaboration of the embodiment example according to FIG. 1, the speeds that are set in the drive train as well as the powers that are transmitted to the individual branches. In detail, curve A shows the speed of the drive shaft 10, curve B shows the speed of the turbine wheel 14 of the hydrodynamic Föttinger converter, curve C shows the speed of the input shaft 2, and curve D shows the speed of the ring gear 17 of the power-split transmission 5. For the power flows, curve F represents the power input by the wind rotor, curve E is the power at the sun wheel 9 of the hydrodynamic Föttinger converter 12, curve G is the power transmitted from the drive train to the electric generator, and curve H gives the power flowing back to the power-split transmission 5 from the hydrodynamic Föttinger converter via the second power branch 18.

Figure 4:
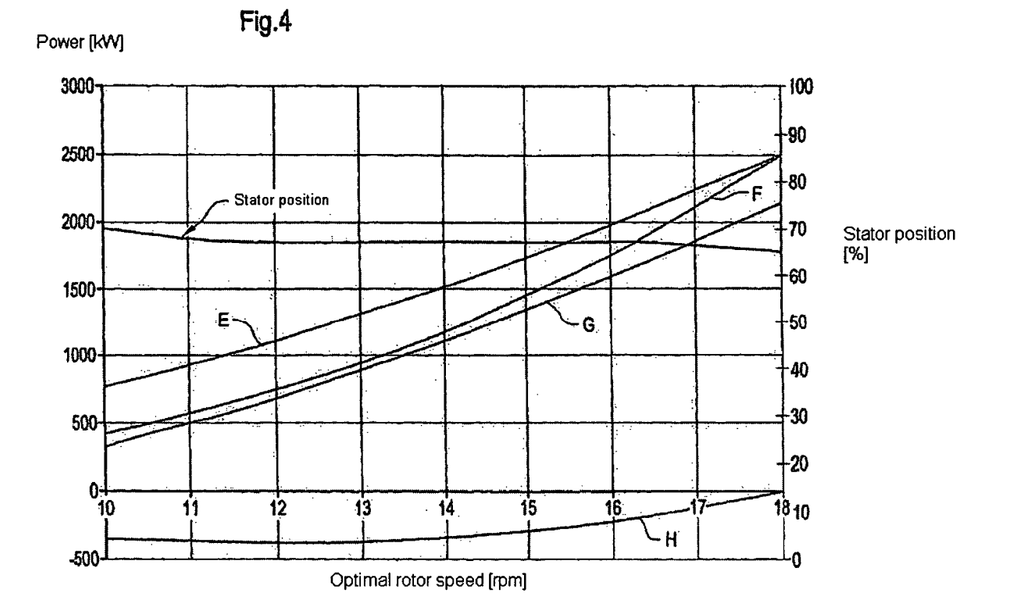
FIG. 4 depicts the power flows and the setting of the reaction member of the mechanical hydrodynamic drive train as a function of the wind turbine speed.

FIG. 4 shows, once again, the power flow for the embodiment example according to FIG. 1 as well as the adjusted position of the reaction member 15 of the hydrodynamic Föttinger converter—in the present case, the stator. The power flow curves E, F, G, and H correspond to those in FIG. 3. It can be seen that, for an optimal power input along the parabolic, which can be reproduced by the characteristic of the drive train, it is possible to operate with an essentially constant guide vane position over the entire partial-load region depicted. This adjusted position will be referred to hereinafter as the adjusted setting of the hydrodynamic Föttinger converter. It is thus unnecessary to make any adjustment in a literal sense in the reaction member in order to achieve the constancy of the output speed of the drive train for feeding the electric generator at a simultaneously variable optimal wind rotor speed. Here, reference is made to the fact that the slope of the parabola characterizing the power input can be adjusted through the gear-ratio dimensioning of the components of the power-split transmission as well as through the dimensioning of the hydrodynamic Föttinger converter. This characteristic of the drive train of the invention will be referred to in the present application as self-control.

FIG. 1 shows, in a generalized manner, a power-split drive train, which has a hydrodynamic circuit 12, which splits off power from the main drive, with which the electric generator 11 is driven, or transmits it retroactively back to the power-split transmission 5. It is also conceivable to construe the drive train in such a way that a partial power is conveyed from the power-split transmission 5 via the hydrodynamic Fottinger converter to the first power branch 7. In so doing, it is possible to employ, as hydrodynamic circuit 12, a hydrodynamic Föttinger converter, a hydrodynamic coupling, or a TRILOK™ converter. As discussed above, for the use of a hydrodynamic Föttinger converter, there exists the advantage of a self-control on account of the agreement between the power input characteristic of a wind rotor and the intrinsic characteristic of the hydrodynamic Föttinger converter. In contrast to this, when a hydrodynamic coupling is chosen as hydrodynamic circuit 12, the power flow between the coupling halves must be actively controlled; the measuring and adjusting means that are necessary for this as well as the controls chosen in each case can be designed in the framework of an expert practitioner's discretion. This notwithstanding, hydrodynamic couplings offer advantages in certain applications. This is due particularly to the fact that a coupling allows the speed regulation of the wind power station to be assisted in a simple manner when the full-load region is entered. This is of advantage particularly for large wind power stations that are projected for use on open ocean. The TRILOK™ converter, in turn, may be preferred in certain areas of operation as an alternative hydrodynamic circuit 12 because of its high efficiency.

Figure 5:
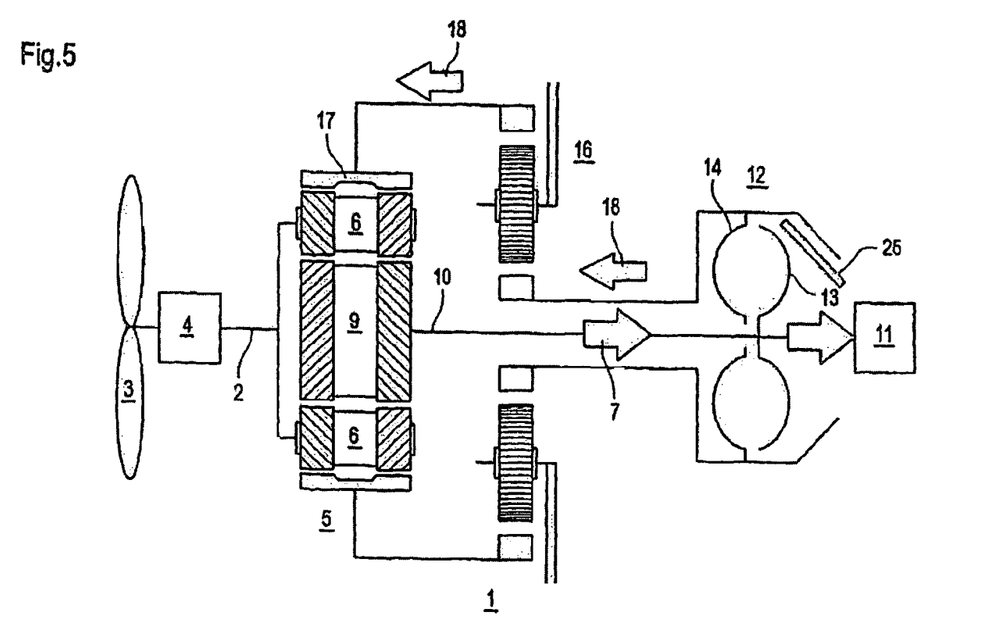
FIG. 5 is a schematic depiction of a power-split wind power station in accordance with the invention, having a hydrodynamic coupling as hydrodynamic circuit.

Shown schematically in FIG. 5 is an embodiment of the drive train of the invention, in which, as hydrodynamic circuit, a hydrodynamic coupling is used. The further components of the drive train as well as the power flows correspond to those according to FIG. 1. The power transmitted from the drive via the input shaft 2 to the power-split transmission 5 is distributed to a first power branch 7 and a second power branch 18 and, in the embodiment example depicted, in the second power branch 18, power flows back in the drive direction, that is, to the power-split transmission. In the present embodiment example, a planetary gear unit is used for power splitting. Here, the power load at the drive end occurs through the planetary gear carrier 6. In addition, the two power branches are designed in such a way that there is a working connection between the sun wheel 9 and the first power branch 7 as well as between the ring gear 17 and the second power branch 18. Corresponding to the embodiment according to FIG. 1, a planetary gear unit 16, which is inserted into the second power branch 18, serves to increase the speed on the output shaft 10 and thus to increase the efficiency of the hydrodynamic circuit 12. However, this is optional.

Further depicted in FIG. 5 is a hydrodynamic coupling having a pump impeller 13 that is connected at least indirectly to the first power branch 7 or the output shaft 10 and a turbine wheel 14 that is connected at least indirectly to the second power branch. Reference number 25 refers to a filling device, which serves to adjust the level of the operating medium in the hydrodynamic coupling and thus the power transmission between the pump impeller 13 and the turbine wheel 14. By way of other means of measurement and adjustment that are not depicted in detail in FIG. 5, the speed of the output shaft 10, which is to be kept constant, is measured and preferably the level of the operating medium in the hydrodynamic coupling is adjusted by means of the filling device 25 in such a way that the speed on the output shaft 10 is kept essentially at a constant specified value.

Generally used as a hydrodynamic circuit 12 is one that can be controlled in its power input and its power output at least to a certain degree. For the present problem being posed and, in particular, for the use in wind power stations, the ability to control these hydrodynamic components is of crucial importance.

In the framework of an expert practitioner's ability, it is possible to elaborate the drive train of the invention in different ways. In doing so, a distinction will be made in the following between two variants of the power flow in accordance with the invention, these variants being depicted by way of examples in FIG. 6a, 6b, 6c, on the one hand, and in FIG. 7a, 7b, 7c, on the other hand. The reference numbers for coinciding components of the drive train are chosen to correspond to those of FIG. 1.

Figure 6A:
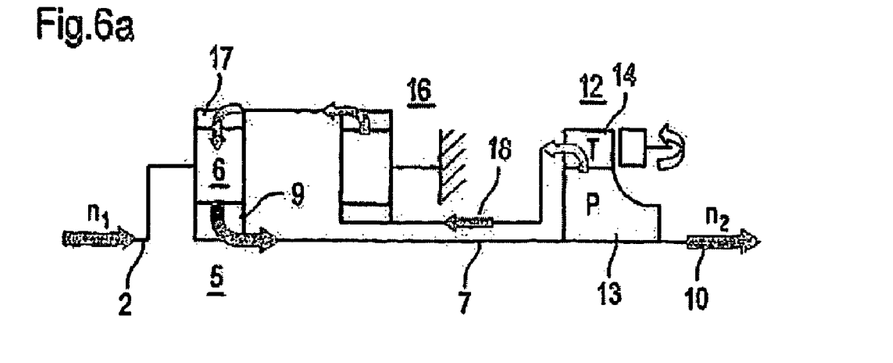
FIG. 6a-c depict embodiment examples of the drive train of the invention, in which a connection between a first and a second power branch exists through a hydrodynamic circuit and reactive power is fed back via a second power branch to the power-split transmission.

The power flow scheme of FIG. 6a corresponds to that of FIG. 1; in this case, the power that is input through the power-split transmission 5 via the input shaft 2, which, here, has a speed of $n_1$, is distributed to a first power branch 7, which drives at least indirectly an electric generator and has the constant output speed $n_2$, and to a second power branch 18.

Figure 6B:
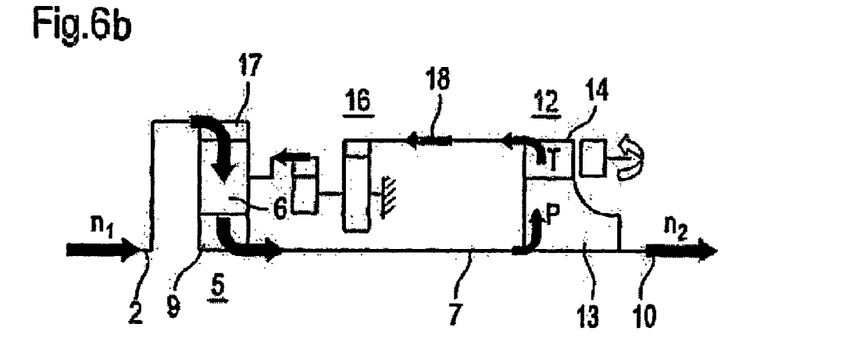
Figure 6C:
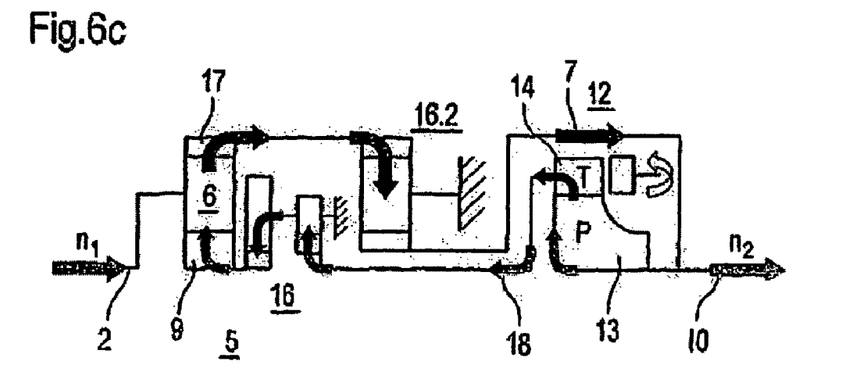

Characteristic of the first embodiment variant shown in FIG. 6a, 6b b 6c is the fact that, via the second power branch 18, power, in the form of reactive power, flows back to the power-split transmission 5. Preferred is also the common connection of the first and second power branch 7, 18 via the hydrodynamic circuit 12, in which, preferably, the pump impeller 13 is connected at least indirectly to the first power branch 7 and the turbine wheel 14 is connected at least indirectly to the second power branch 18.

The embodiment differences shown schematically in FIG. 6a, 6b, 6c ensue from the kind of power splitting in the power-split transmission 5. According to FIG. 6a, the power input occurs via the planetary gear carrier 6, the first power branch 7 is in working connection with the sun wheel 9, and the second power branch 18 affords a feedback to the ring gear 17. According to FIG. 6b, the power input occurs via the ring gear 17, the first power branch 7 is, in turn, in working connection with the sun wheel 9, and the second power branch 18 is coupled at least indirectly to the planetary gear carrier 6. According to FIG. 6c, for a power input via the planetary gear carrier 6, the first power branch 7 can engage in working connection with the ring gear 17 and the second power branch 18 can engage in working connection with the sun wheel 9. Furthermore, it is possible to insert additional transmissions as stationary transmissions into the power branches; these are depicted schematically in the embodiment examples as planetary gear units and are furnished with the reference numbers 16 and 16.2.

Figure 7A:
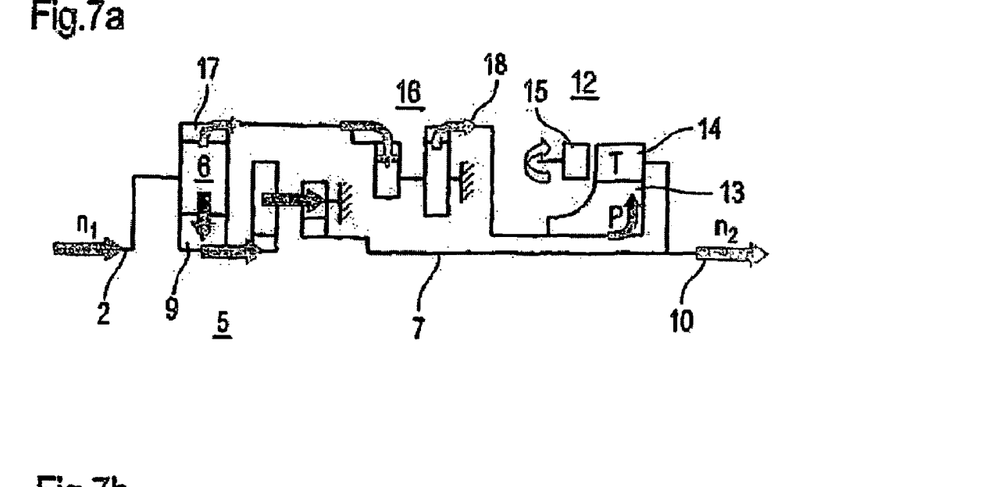
FIG. 7a-c depict embodiment examples of the drive train of the invention, in which power is conveyed to a second power branch in the forward direction and is fed into a first power branch through a hydrodynamic circuit.
Figure 7B:
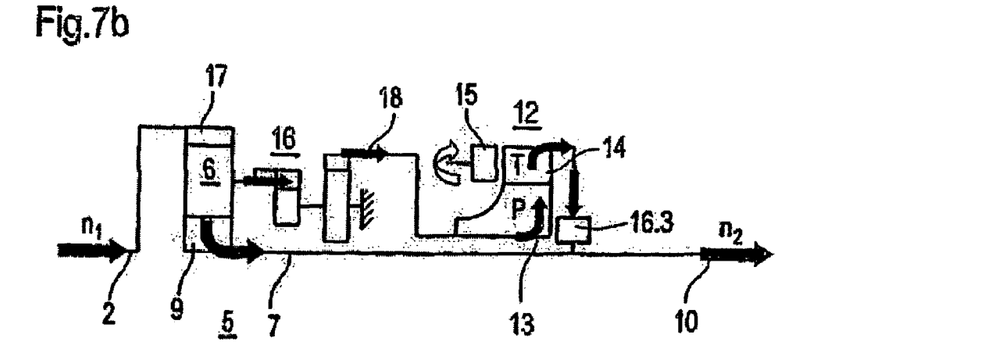
Figure 7C:
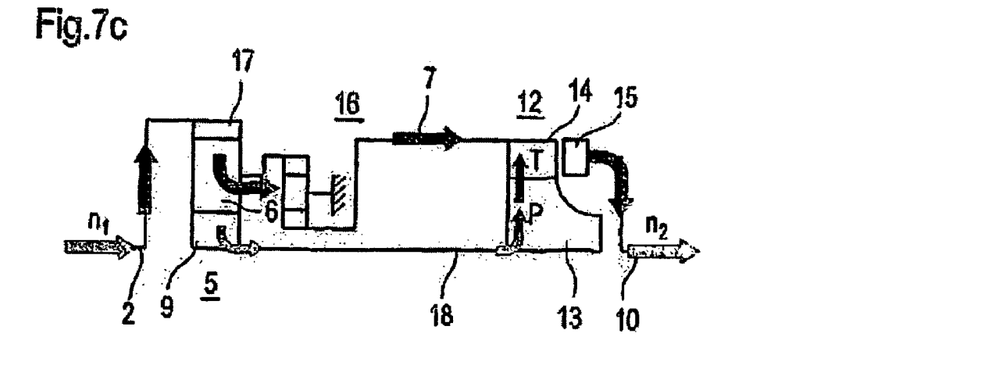

A further embodiment variant of the drive train of the invention is shown in FIG. 7a, 7b, 7c. In distinction to the embodiments depicted above, the power flow occurs in this case in the second power branch 18 in the forward direction, that is, in the direction of the output end. To this end, in the embodiment according to FIG. 7a and 7b, the pump impeller 13 of the hydrodynamic circuit 12—in this case, a hydrodynamic Föttinger converter—is connected at least indirectly to the second power branch 18 and, via the turbine wheel 14, there exists a working connection to the first power branch 7 and accordingly a working access to the output shaft 10, which rotates at constant speed $n_2$.

Differences between the embodiments according to FIG. 7a and FIG. 7b ensue from the kind of power input and from the kind of power splitting in the power-split transmission 5; in FIG. 7a, the planetary gear carrier 6 is coupled at least indirectly to the input shaft 2 and a working connection exists via the ring gear 17 to the second power branch 18 and via the sun wheel 9 to the first power branch 7. According to FIG. 7b, the power input can also occur via the ring gear 17 and a working connection exists via the planetary gear carrier 6 to the second power branch 18 and via the sun wheel 9 to the first power branch 7.

Furthermore, it is possible, in turn, for different intervening transmissions to be realized in the power branches and these can then be designed as, for example, planetary gear unit 16. In addition, it is possible to construct an additional transmission stage 16.3 in the region of indirect coupling of the hydrodynamic circuit to the power branches 7, 18. This is shown in the embodiment according to FIG. 7b.

A further embodiment example for the power flow in the forward direction in the second power branch 18 is depicted in FIG. 7c. Here, there exists a working connection of the second power branch 18 to the hydrodynamic circuit 12 via a coupling to the pump impeller 13, while, via the turbine wheel 14, power is fed at least indirectly into the first power branch 7.

Figure 8A:
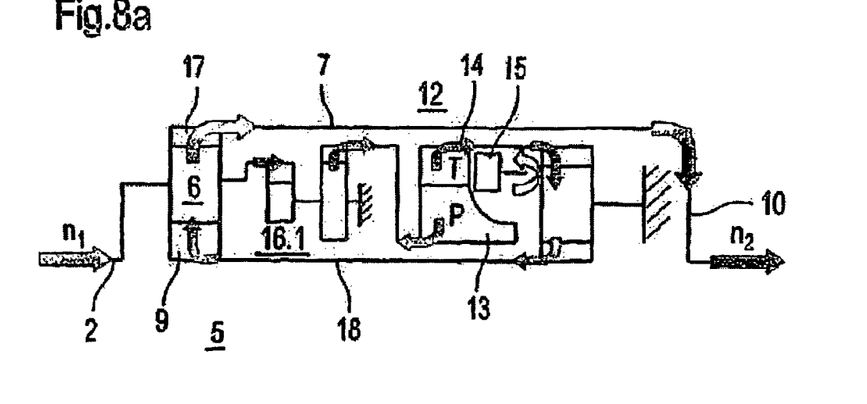
FIG. 8a-c depict embodiment examples of the drive train of the invention, in which, by means of a first power branch, an electric generator is driven and, in a second, separated power branch, a hydrodynamic circuit controls the reactive power flow.
Figure 8B:
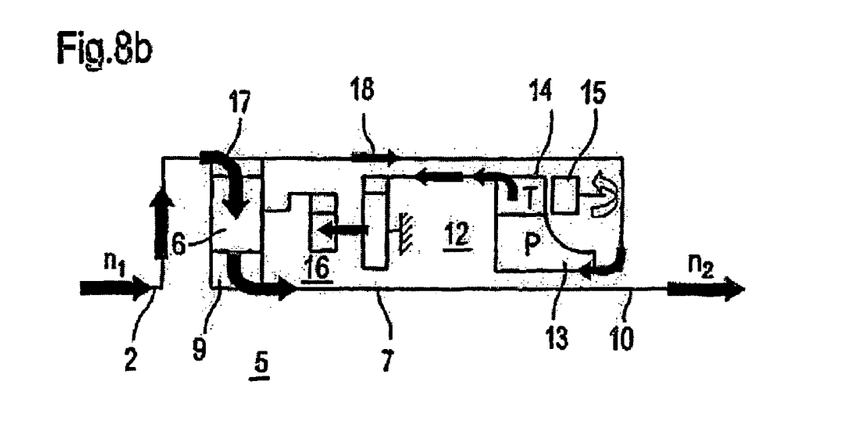
Figure 8C:
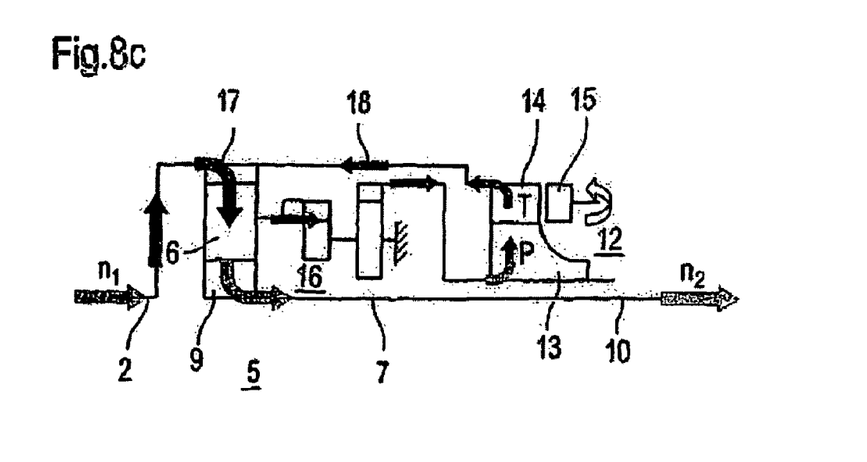

A further embodiment of the drive train of the invention, which, at a variable input speed and a variable power input, has an essentially constant output speed, is depicted in FIG. 8a, 8b, 8c. In distinction to the preceding embodiments, the hydrodynamic circuit 12 is not in working connection to a first power branch 7 or an output shaft 10 of the power-split transmission 5, which drives at least indirectly the electric generator. Instead of this, the hydrodynamic circuit 12 controls the power flow to a second power branch 18, a reactive power branch, which is in connection at least indirectly with the power-split transmission 5 as well as with the input shaft 2 and which feeds back power to the power-split transmission 5.

In FIG. 8a, the power input occurs to the power-split transmission 5 via the planetary gear carrier 6. Also connected to the planetary gear carrier 6 is a stationary transmission—in this case, a planetary gear unit 16—which serves to increase the speed and which drives the pump impeller 13 of the hydrodynamic Föttinger converter. Via the turbine wheel 14 and an additional stationary transmission 16.2, power then flows in the form of reactive power back to the sun wheel 9 of the power-split transmission 5. Through the control of the reactive power flow by means of the hydrodynamic circuit 12, it is possible to keep essentially constant the speed of the output shaft 10, which is connected at least indirectly to the ring gear 17. FIGS. 8b and 8c show further embodiments of this principle, in which, in each case, the drive-end power input to the power-split transmission 5 is changed.

Characteristic of a hydrodynamic circuit 12 in the combination in accordance with the invention, which has a power-split transmission 5, is a certain softness in the reactivity. Under this, an adequate dampening without power loss is exploited for an advantageous control behavior, which results from the masses of the hydrodynamic circuit 12 that are moved. In particular, short-time fluctuations in the system, such as those occurring for wind power stations due to shadow effects or during gusts, can thus be well cushioned by the system of the invention and this represents a substantial advantage from the point of view of control engineering for maintaining constant the output speed of the drive train of the invention.

Further characteristic of the arrangement of the invention is the fact that, through the use of at least one hydrodynamic circuit 12 that exerts feedback on the power-split transmission 5, it is possible to realize an energy-storing effect, at least a short-term one. This, too, has an advantageous effect on the control characteristic of the drive train of the invention.

Figure 11:
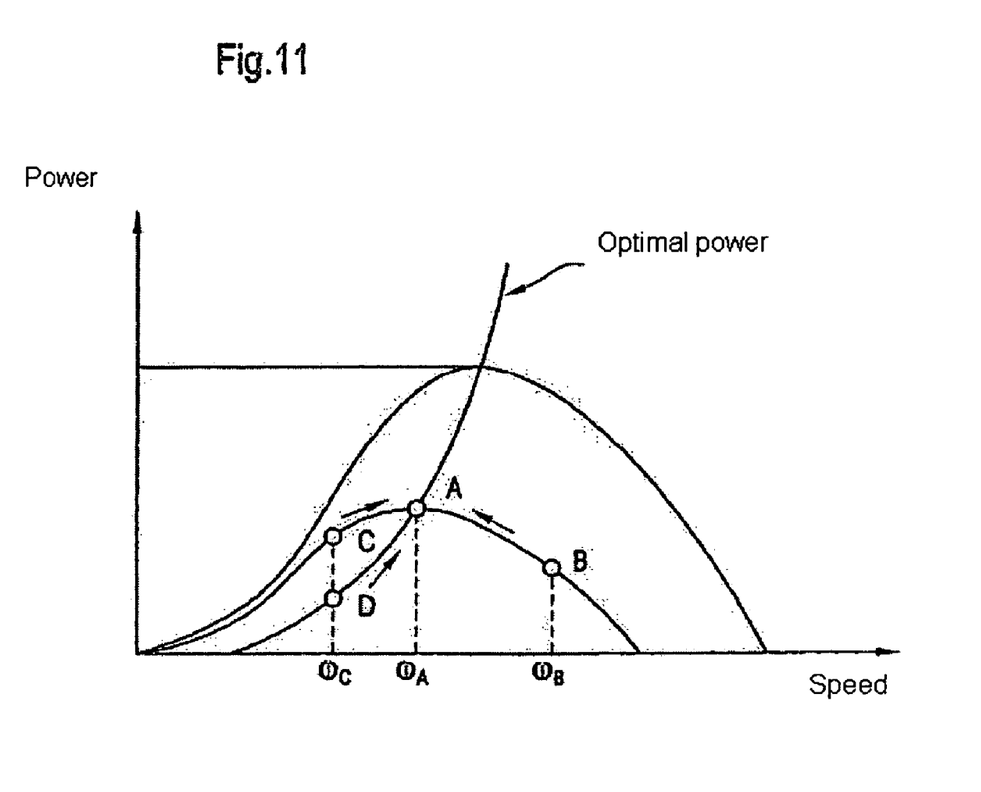
FIG. 11 illustrates a control for optimal power output of the rotor.

FIG. 11 illustrates, in turn, by way of a wind power station as example, the flexible adaptation of an input speed of a drive train and thus a rotor speed that is optimally adapted to the wind, whereby, at the same time, a constant output speed (generator speed) is assumed. Depicted are different point of operations A, B, and C, which correspond to various performance coefficients together with the associated rotor speeds $\omega_C$, $\omega_A$, and $\omega_B$. At point A, the rotor withdraws from the air flow an optimal power. At point C, only a part of the possible rotor power is exploited and, consequently, the hydrodynamic circuit is controlled in such a way, in the power input from the main drive train and in the power delivered in the feedback to the power-split transmission, that the rotor is accelerated until it attains the optimal point of operation A. The control starting from the point of operation B takes place with an opposite sign. Accordingly, this corresponds to the control in an optimal point of operation at a wind speed that is assumed to be constant.

Furthermore, it is possible that a certain fluctuation in the wind occurs, through which the constant point of operation is shifted. An example of this is the point D, which, like the point A, lies on the curve of optimal power and corresponds to a lower wind speed. Accordingly, the drive train of the invention also makes it possible to adjust or control a time-variable input power with variability in time of the input speed.

Figure 9:
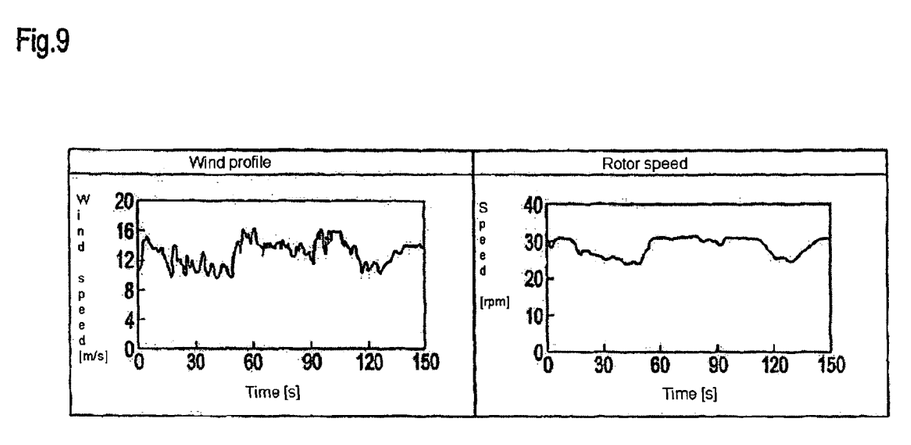
FIG. 9 shows the wind profile of a station in accordance with the invention as well as the associated rotor speed.

FIG. 9 shows, to this end, a wind profile having a wind speed that fluctuates in time, which, in turn, is converted to an optimal rotor speed. In this process, a certain degree of smoothing takes place on account of the inertia of the mechanical components used, namely, the rotor, the gear unit, the hydrodynamic circuit, etc.

Generally understood in the framework of the idea of the invention of creating a drive train having a constant output speed is also such a system that keeps the output speed constant with a certain degree of precision. Certain deviations can be tolerated here. The deviations in this case can lie, for example, in the range of ±10%, preferably ±5%, and especially preferably ±1% of the specified output speed. When wind power stations are used for generators that are strongly coupled with the distribution network, however, an especially high constancy of the output speed of at most ±0.5% is preferred, which further supports the network being operated.

Further possibilities of applying a drive train in accordance with the invention beyond wind power ensue, for example, for special water power stations in which turbines that to be operated at a constant speed are employed. Such conditions can exist, for example, in current and tidal power stations or for special arrangements in sluice systems. In addition, it is conceivable to use the principle of the invention to transmit natural and thus time-variable energy sources, such as wave power, to an electric generator that requires a constant input speed.

The invention claimed is:

1. A drive train for the transmission of a variable power at a variable input speed for a power generating station driven with a turbomachine, the drive train comprising:
   a power-split transmission for receipt of power from a single source, said power-split transmission having an input shaft, at least one first power branch, and at least one second power branch, wherein the first power branch drives an electric generator;
   a hydrodynamic circuit disposed at an output end of the power-split transmission, wherein the hydrodynamic circuit connects the first power branch and the second power branch and controls power flow so that the electric generator is driven at a speed that is substantially constant; and
   wherein the hydrodynamic circuit is a torque converter, the torque converter having a pump impeller connected to a rapidly spinning shaft of the power-split transmission, wherein the rapidly spinning shaft is an output shaft of the drive train to which the electric generator is connected, and wherein the rapidly spinning shaft is part of the first power branch.

2. The drive train of claim 1, further comprising a second transmission connected in series with the power-split transmission.

3. The drive train of claim 2, wherein the second transmission is arranged in the second power branch and increases a speed at which the hydrodynamic circuit is operated.

4. The drive train of claim 3, wherein an output speed is held constant with a maximum deviation of ±10 percent of a rated value.

5. The drive train of claim 3, wherein an output speed is held constant with a maximum deviation of ±5 percent of a rated value.

6. The drive train of claim 3, wherein an output speed is held constant with a maximum deviation of ±1 percent of a rated value.

7. The drive train of claim 3, wherein the hydrodynamic circuit further comprises a pump and a stator having adjustable vanes, wherein power input of the pump can be adjusted.

8. The drive train of claim 3, wherein the hydrodynamic circuit further comprises a turbine wheel and a stator having adjustable vanes, wherein power flow to the turbine wheel can be adjusted.

9. The drive train of claim 3, wherein power input occurs via a planetary gear carrier, wherein the first power branch is operably connected to a sun wheel, and wherein the second power branch provides feedback to a ring gear.

10. The drive train of claim 3, wherein power input occurs via a ring gear, wherein the first power branch is operably connected to a sun wheel, and wherein the second power branch is coupled to a planetary gear carrier.

* * * * *